Patented Nov. 5, 1946

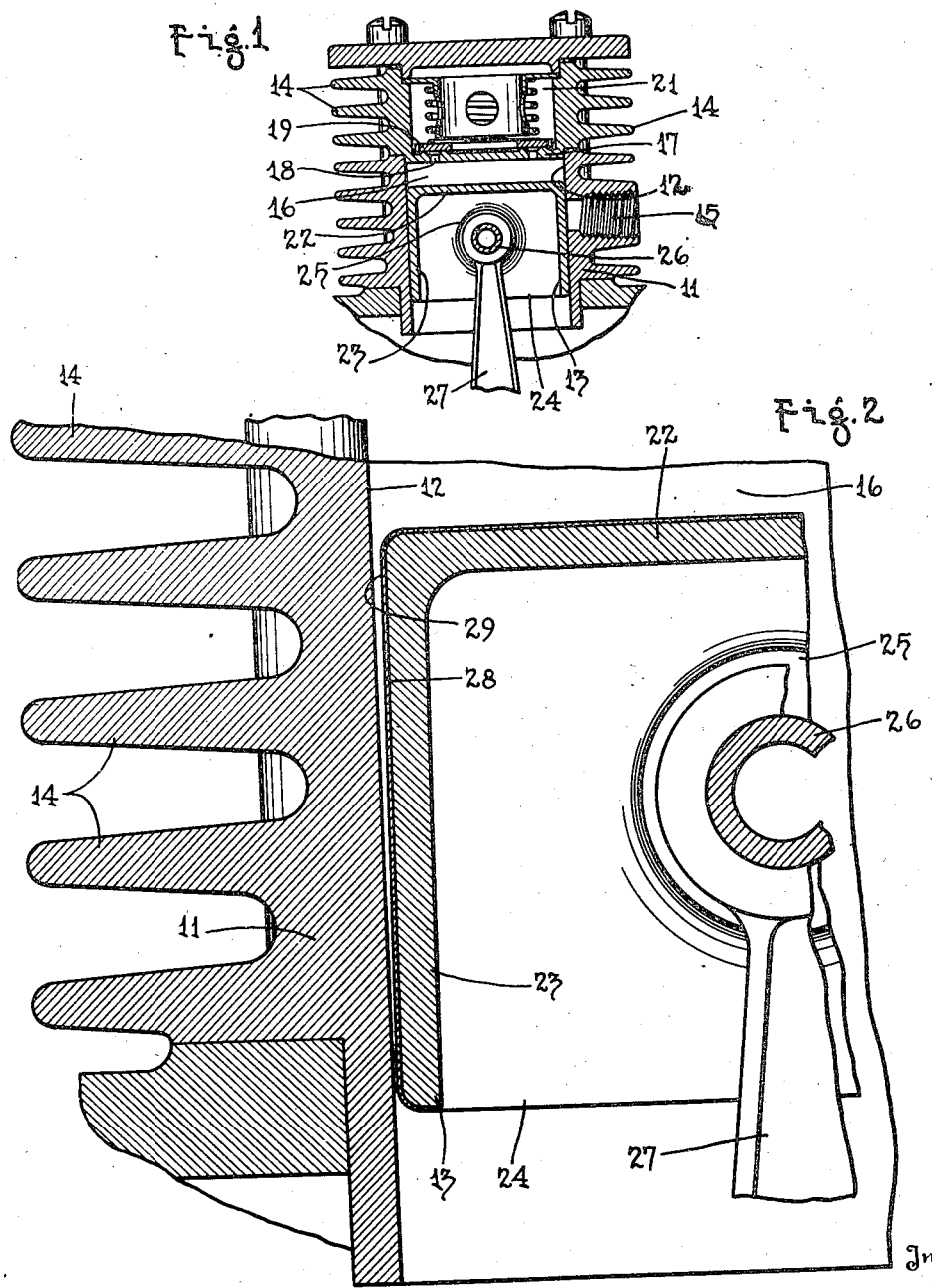

2,410,405

UNITED STATES PATENT OFFICE 2,410,405

PISTON

Richard T. Cornelius, Minneapolis, Minn.

Application January 1, 1945, Serial No. 570,916

10 Claims. (Cl. 309—4)

My invention relates to pistons and has for an object to provide a simple and practical construction for reducing the pumping of oil and the escape of the fluid pumped between the piston and cylinder.

An object of the invention resides in providing a piston in which pumping of oil and leakage of fluid is accomplished without the use of piston rings.

A still further object of the invention resides in providing a piston which may be fitted to the cylinder with exceedingly small clearance.

A further object of the invention resides in providing a piston which will have exceedingly great life.

A feature of the invention resides in providing a piston and cylinder construction by means of which the clearance between the piston and cylinder is virtually unaffected by change in temperature.

Other objects of the invention reside in the novel combination and arrangement of parts and in the details of construction hereinafter illustrated and/or described.

In the drawing:

Fig. 1 is an elevational longitudinal sectional view of a cylinder and a piston of a compressor illustrating the application of my invention thereto.

Fig. 2 is a view similar to Fig. 1 of a portion of the structure shown therein and drawn to an enlarged scale.

In the compressing of air by means of pistons and cylinders to high pressures, considerable difficulty has been encountered in properly lubricating the pistons and in preventing the pumping of oil between the piston and the cylinder and in preventing the loss of the fluid pumped therebetween. The present invention overcomes this disadvantage by providing a piston construction permitting of close clearance between the cylinder and piston, without the attendant difficulties usually encountered in such construction.

For the purpose of illustrating my invention, I have shown in the drawing a cylinder 11 forming a portion of an air compressor which has not been illustrated. This cylinder has a bore forming an inner cylindrical surface 12 along which the piston proper, indicated at 13, slides. The surface 12 is uniform in diameter throughout the portion thereof along which the piston slides and may be of any other suitable diameter at other portions thereof. The cylinder 11 has a number of radiating fins 14 issuing outwardly therefrom by means of which the same is cooled and is constructed with a port 15 extending through the same and adapted to form an inlet for air into the cylinder chamber 16.

Closing one end of the cylinder 12 is a cylinder head 17 which has outlet passageways 18 formed therein. These passageways are adapted to be closed by means of a valve 19 operating in a valve chamber 21. Air drawn in through the inlet 15 is compressed by the piston 13 and is discharged through the passageway 18 and past the valve 19 into a discharge conduit, not shown.

The piston 13 is constructed with a head 22 at the pressure end of the piston and is further formed with a skirt 23 which extends axially along the piston and which, in the case of the piston shown, forms the circumferential portion of the piston. The end of the skirt 23 which constitutes the end of the piston opposite the pressure end has been termed the free end of the piston and is designated by the reference numeral 24. The circumferential portion 23 of the piston is provided with suitable bosses 25 in which is journaled a wrist pin 26. A connecting rod 27 is attached to this wrist pin and is connected to the crank of the compressor in the usual manner. Since the invention embodies particularly the piston and cylinder, the rest of the compressor has not been shown in this application, although it can readily be comprehended that the invention may be applied to an engine pump or to any device of similar character utilizing a piston and cylinder.

The invention proper consists in the construction of the circumferential portion 23 of the piston 13. As will be evident from Fig. 2, the exterior of the circumferential portion 23 of piston 13 is provided with a layer 28 of chrome which may be formed on said portion of the piston by plating or otherwise. The outer surface 29 of this layer of chrome is the surface which slides along the interior surface 12 of the cylinder 11. The circumferential portion 23 is so shaped that the surface 29 is tapered or conical, being of greatest diameter adjacent the free end 24 of the piston. At this locality, the clearance between the surface 29 and the surface 12 is in the neighborhood of one ten-thousandth of an inch. The taper on the surface 29 is approximately three ten-thousandths of an inch for each inch in length of the piston, which produces an angle of substantially one minute between an element of the surface 29 and the longitudinal axis of the piston proper. I have found that these dimensions are suitable for cylinders from one inch to 4 inches in diameter, slight variations being required for pistons over and above such dimensions. In the construction of the invention, the same material is used for both the cylinders and pistons, so that expansion due to heat will be the same in both the cylinder and piston. In addition, the cylinder and cylinder head are provided with sufficient cooling fins so that the temperature of both the cylinder and piston will be approximately the same. In this manner, the clearance may be maintained constant regardless of the temperature of the compressor.

In the construction of pistons with close tolerance where both the cylinder and piston have been cylindrical, lubrication has been a serious problem. By constructing the piston in the manner of my invention, a sufficiently tight contact is procured between the piston and the cylinder at the free end of the piston. This permits of profusely lubricating the crank case and the free end of the cylinder and the piston. With greater clearance toward the pressure end of the piston, a space is provided in which an oil film will collect and by means of which the lubrication of the piston is procured. I have found in practice that this oil film is maintained throughout continuous operation of the compressor and that practically no oil is pumped by the piston and that the leakage past the piston of the fluid pumped is considerably less than where metallic piston rings are employed. Usually, where the clearance or tolerance is as low as employed by me in this form of the invention, it becomes impossible to lubricate the piston, and scoring and sticking of the piston usually results. With my invention, these disadvantages are completely eliminated and the piston is thoroughly lubricated and travels freely within the cylinder without appreciable loss of pressure and without excessive pumping of oil.

While I have shown my invention applied to a hollow piston with connecting rod pivoted thereto, it can readily be comprehended that the invention may be utilized with solid pistons and with pistons in which a rigid piston rod is secured to the piston proper. Also, the invention may be used with engines as well as pumps.

The advantages of my invention are manifest. The use of piston rings is completely done away with with my invention. The friction on the surface of the piston and cylinder is considerably less than with the conventional piston and cylinder where piston rings are employed. My invention is extremely simple in construction and can be manufactured at an economical cost. With my invention, extremely high pressures can be pumped without sacrifice in lubrication, thereby making the invention highly desirable for use as a compressor or similar device.

Changes in the specific form of my invention, as herein described, may be made within the scope of what is claimed without departing from the spirit of my invention.

Having described my invention, what I claim as new and desire to protect by Letters Patent is:

1. A piston for use in a cylinder having an inner surface of predetermined uniform diameter throughout the portion thereof traversed by the piston, said piston having a pressure end, a free end and a circumferential portion formed with an outer surface adapted to follow along the inner surface of the cylinder, the outer surface of the circumferential portion of the piston being continuous circumferentially at a locality near the free end of the piston and being of lesser diameter at the pressure end of the piston than at the free end thereof.

2. A piston for use in a cylinder having an inner surface of predetermined uniform diameter throughout the portion thereof traversed by the piston, said piston having a pressure end, a free end and a circumferential portion formed with an outer surface adapted to follow along the inner surface of the cylinder, the outer surface of the circumferential portion of the piston being continuous circumferentially at a locality near the free end of the piston and tapering from the free end of the piston to the pressure end thereof.

3. A piston for use in a cylinder having an inner surface of predetermined uniform diameter throughout the portion thereof traversed by the piston, said piston having a pressure end, a free end and a circumferential portion, a layer of chrome covering said circumferential portion and having an outer surface following along the inner surface of the piston, said outer surface of the chrome layer being of lesser diameter at the pressure end of the piston than at the free end thereof.

4. A piston for use in a cylinder having an inner surface of predetermined uniform diameter throughout the portion thereof traversed by the piston, said piston having a pressure end, a free end and a circumferential portion, a layer of chrome covering said circumferential portion and having an outer surface following along the inner surface of the piston, said outer surface of the chrome layer tapering from the free end of the piston to the pressure end thereof.

5. A piston having a pressure end and a free end and a circumferential portion formed with an outer surface adapted to follow along the interior surface of a cylinder, said outer surface of the circumferential portion of the piston when installed in the cylinder having a taper such that an element of said surface forms an angle of substantially one minute with the longitudinal axis of the piston.

6. A piston having a pressure end and a free end and a circumferential portion formed with an outer surface adapted to follow along the interior surface of a cylinder, said outer surface of the circumferential portion of the piston having a taper of approximately three ten-thousandths of an inch per inch in length of the piston when installed in the cylinder.

7. A piston for use in a cylinder having an inner surface of predetermined uniform diameter throughout the portion thereof traversed by the piston, said piston having a pressure end, a free end and a circumferential portion formed with an outer surface adapted to follow along the inner surface of the cylinder, the outer surface of the circumferential portion of the piston when installed in the cylinder tapering from the free end of the piston to the pressure end thereof, the clearance between the outer surface of the circumferential portion of said piston at the free end and the inner surface of said cylinder being substantially one ten-thousandth of an inch.

8. A piston for use in a cylinder having an inner surface of predetermined uniform diameter throughout the portion thereof traversed by the piston, said piston having a pressure end, a free end and a circumferential portion formed with an outer surface adapted to follow along the inner surface of the cylinder, the outer surface of the circumferential portion of the piston tapering from the free end of the piston to the pressure end thereof when installed in the cylinder, said surface having a taper of substantially three ten-thousandths of an inch per inch in length, the minimum clearance between said surface and the inner surface of the cylinder being substantially one ten-thousandth of an inch.

9. A piston for use in a cylinder having an inner surface of predetermined uniform diameter throughout the portion thereof traversed by the piston, said piston having a pressure end, a free end and a circumferential portion formed with an outer surface adapted to follow along the inner surface of the cylinder, said piston having wrist pin bosses located intermediate the pressure end and the free end thereof, the outer surface of the circumferential portion of the piston tapering from the free end of the piston to the pressure end thereof, and being continuous circumferentially at a locality between the bosses and the free end thereof.

10. A piston having a pressure end and a free end and a circumferential portion formed with an outer surface adapted to follow along the interior surface of a cylinder, the outer surface of the circumferential portion of the piston being of its greatest diameter at a locality remote from the pressure end and being at its locality of greatest diameter continuous circumferentially.

RICHARD T. CORNELIUS.